Patented May 30, 1950

2,509,874

UNITED STATES PATENT OFFICE 2,509,874

PRODUCTION OF CYCLIC ACETALS

James Howard McAteer, Cranford, N. J., assignor to Standard Oil Development Company, a corporation of Delaware No Drawing. Application April 23, 1947, Serial No. 743,469

5 Claims. (Cl. 260—338)

This invention relates to a method of producing cyclic acetals, more particularly to the formation of branched cyclic acetals which possess a five-membered ring nucleus of three carbon atoms and two oxygen atoms with alkyl side chains attached to different nuclear carbon atoms. These compounds may be regarded as homologs of 1,3-dioxolane.

Literature describes that some 1,3-dioxolanes are formed by reacting an aldehyde or ketone with an alpha glycol in equimolecular proportions, but a difficulty in the reaction is encountered due to the tendency of the carbonyl reactants to polymerize at elevated temperatures.

An object of this invention is to provide a process of producing satisfactory yields of cyclic acetals by minimizing side reactions, such as polymer formation.

Another object is to provide a process for preparing branched cyclic acetals having unique configurations.

A further object is to provide a process of producing cyclic acetals economically by chemical dehydration and condensation of polyhydric alcohol molecules.

The present invention is based on my discovery that glycols having hydroxyl groups on adjacent carbon atoms when heated with a small amount of a non-volatile acidic condensing catalyst to a temperature at which the glycols start to vaporize, react by themselves to form cyclic acetals as a major product.

The preferred catalyst for the reaction is a substance which has a dehydrating effect, is mixed as a liquid with the reactant glycol, but remains unvaporized during the reaction.

During the reaction, the cyclic acetal product is preferably distilled from the reaction mixture, as this product is formed together with water and a small amount of other decomposition by-products. Any unconverted glycol distilled from the reaction mixture may be recovered for re-use.

The following experiments will serve to demonstrate the process, but are not intended to limit the invention:

Example 1

Alpha propylene glycol (62.5 g.) was placed in a flask attached to a vapor take-off head and a water condenser. To the glycol in the flask was added 1 cc. (1.8 g.) of 96% H2SO4. The mixture of glycol and acid was heated to ebullition, and distillation was started. The overhead vapor temperature remained generally between 122 and 135° C. At the end of 30 minutes, the distillation was discontinued. There remained 10.9 g. of a dark brown residue in the flask. This residue contained the acid, some unconverted glycol, and a small amount of polymers. The distillate consists of two phases, an aqueous layer (23 cc.) and an organic layer (31.5 cc.) together weighing 52.4 g. On redistillation of the distillate with admixed water in a proportion of about 50%, there were obtained 2.7 g. of a mixture of propionaldehyde and acetone, the aldehyde predominating, and 16.1 g. of a water-white, water-insoluble liquid having the following properties:

B. P. 116–121° C.; $n_D^{20}$ 1.4075; $d_{20}^{20}$ 0.939

Analysis:
C, 61.42%
H, 10.48%

Empirical formula: $C_6H_{12}O_2$
Conversion of the glycol, 62 mole percent
Selectivity to dioxane, 55 mole percent Hydrolysis of this liquid with dilute acid caused formation of propionaldehyde. The compound was indicated to possess the characteristics of 2-ethyl, 4-methyl, 1,3-dioxolane, having the structural formula:

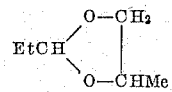

Example 2

90 grams (1.0 mol) of 2,3-butylene glycol were placed in a flask with 1.4 gm. of 96 wt. % sulfuric acid and the mixture heated. The volatile reaction products were distilled off through a short rectification section to which was attached a vapor take-off head and a water condenser. The vapor temperature remained between 85 and 95° C. The collected distillate consisted of two layers. The lower layer amounted to 23 grams (23 cc.) while the upper layer consisted of 69.2 grams (83 cc.) of predominantly organic products. The upper layer was dried and redistilled to produce 26 grams of a liquid boiling at 138–150° C. This material had a density of 0.90 at room temperature and was soluble to the extent of 2 volumes per 100 volumes of water at the same temperature. Analysis of this liquid for free carbonyl compounds showed the presence of not over 0.08 wt. percent carbonyl compounds as methyl ethyl ketone. Hydrolysis of the liquid in the presence of dilute (0.01 N) hydrochloric acid took place readily on refluxing at 100° C. to produce a quantitative yield of methyl ethyl ketone. The liquid reaction product is indicated to possess the following structure:

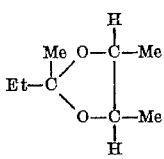

2,4,5-trimethyl-, 2-ethyl-dioxolane-1,3

| | Mol percent |
|---|---|
| Glycol Conversion | 90 |
| Selectivity to dioxolane | 40 |

From the observations that have been made, the cyclicizing condensation reaction is generally applicable to glycols or polyhydric alcohols capable of reacting with a carbonyl compound in the presence of a condensing agent to give five-membered ring acetals. Such glycols are of the type

RCHOHCHOHR₁ wherein R and R₁ represent hydrogen and hydrocarbon substituents and may contain 2 to 6 carbon atoms per molecule generally.

Advantages of producing the cyclic acetals in accordance with the procedure outlined are:

(1) Elimination of the need for supplying a carbonyl compound as a reactant;

(2) Simplicity of operation; and (3) Control of by-product formation.

In the procedure outlined, the volatile products are promptly removed from the reaction zone as they are formed, thus reducing opportunity for side reactions of these products while the cyclic acetal molecule is formed by the condensation reaction from two molecules of the glycol or polyhydric alcohol.

The cyclic acetal or dioxolane products are useful as solvents stable to alkalies but not to acids. They have uses as chemical intermediates. They have been indicated to have desirable properties as anti-knock motor fuel blending agents, particularly those with side chains which are readily made with the present invention.

I claim:

1. The method of preparing a 1,3-dioxolane from a polyhydric alcohol having hydroxyl groups on adjacent carbon atoms, which comprises chemically condensing together molecules of the alcohol, per se, in a liquid reaction mixture consisting of said alcohol and a small amount of concentrated sulfuric acid, heating said mixture until the alcohol is substantially converted to a 1,3-dioxolane, and thereafter distilling from said mixture the 1,3-dioxolane product with other volatilized products of the reaction.

2. The method of preparing a 1,3-dioxolane from an alkylene glycol, which comprises heating to ebullition a liquid mixture consisting essentially of the alkylene glycol and a small amount of concentrate of sulfuric acid, chemically condensing the alkylene glycol per se, and thereafter removing from the heated mixture by distillation a resulting 1,3-dioxolane product together with water of dehydration and carbonyl compounds.

3. The method of preparing a 1,3-dioxolane from a C₂ to C₆ alkylene glycol, having hydroxyl groups on adjacent carbon atoms which comprises heating to ebullition a liquid mixture consisting essentially of the alkylene glycol together with a small amount of concentrated sulfuric acid, chemically condensing the alkylene glycol per se, and distilling from said mixture a resulting 1,3-dioxolane together with water of dehydration and carbonyl compounds.

4. The method of preparing 2-ethyl-4-methyl 1,3-dioxolane, which comprises forming a liquid mixture consisting of 1,2-propylene glycol with a small amount of concentrated sulfuric acid, heating the mixture to ebullition, chemically condensing said propylene glycol per se, and distilling from the heated mixture the resulting 2-ethyl-4-methyl 1,3-dioxolane product with water of dehydration and carbonyl compounds formed by chemical condensation of the glycol.

5. The method of preparing a cyclic acetal which comprises forming a liquid reaction mixture consisting of 2,3-butylene glycol with a small amount of concentrated sulfuric acid, heating said mixture, chemically condensing said glycol per se, and distilling from the heated mixture the resulting 1,3-dioxolane formed by chemical condensation of the 2,3-butylene glycol in the reaction mixture.

JAMES HOWARD McATEER.

REFERENCES CITED

The following references are of record in the file of this patent:

UNITED STATES PATENTS

| Number | Name | Date |
|---|---|---|
| 1,681,861 | Knorr et al. | Aug. 21, 1928 |
| 1,939,189 | Steimmig et al. | Dec. 12, 1933 |
| 2,031,594 | Dreyfus | Feb. 25, 1936 |
| 2,078,534 | Groll et al. | Apr. 27, 1937 |
| 2,095,320 | Dreyfus | Oct. 12, 1937 |
| 2,140,938 | McNamee et al. | Dec. 20, 1938 |
| 2,350,940 | Squires | June 6, 1944 |
| 2,428,805 | Kharasch | Oct. 14, 1947 |